United States Patent [19]
Fedele

[11] Patent Number: 5,920,354
[45] Date of Patent: Jul. 6, 1999

[54] HDTV TO NTSC TRANSCODER SYSTEM

[75] Inventor: Nicola John Fedele, Kingston, N.J.

[73] Assignee: Thomson Consumer Electronics, Indianapolis, Ind.

[21] Appl. No.: 09/006,911

[22] Filed: Jan. 13, 1998

[51] Int. Cl.$^6$ .................................................. H04N 7/01
[52] U.S. Cl. ........................................... 348/446; 348/445
[58] Field of Search .................................... 348/446, 445, 348/581, 441, 458, 459, 447, 558

[56] References Cited

U.S. PATENT DOCUMENTS

| | | | |
|---|---|---|---|
| 4,872,054 | 10/1989 | Gray et al. | 348/558 |
| 5,355,328 | 10/1994 | Arbeiter et al. | 348/445 |
| 5,497,198 | 3/1996 | Kim | 348/445 |
| 5,587,742 | 12/1996 | Hau et al. | 348/441 |
| 5,781,241 | 7/1998 | Donovan | 348/446 |

*Primary Examiner*—Victor R. Kostak
*Attorney, Agent, or Firm*—Jeffrey D. Carter

[57] ABSTRACT

Image signals are transcoded from a first format to a second format, by employing multi-tap horizontal and vertical filters. The first format has higher horizontal and vertical resolution than the second format. The multi-tap horizontal filter filters lines of the image signals to convert the horizontal resolution of the first format into the horizontal resolution of the second format, wherein the horizontal filter has a filter tap ratio selected in accordance with the horizontal ratio of the first format to the second format. The multi-tap vertical filter for filtering columns of the image signals to convert the vertical resolution of the first format into the vertical resolution of the second format, wherein the vertical filter has a filter tap ratio selected in accordance with the vertical ratio of the first format to the second format.

20 Claims, 10 Drawing Sheets

| | INPUT TO VF | OUTPUT OF VF | OUTPUT OF FIFO WITH HALF RATE CLOCK | OUTPUT OF 1ST MUX WITH HALF RATE CLOCK | OUTPUT OF 2ND MUX WITH HALF RATE CLOCK |
|---|---|---|---|---|---|
| EVEN PIXEL 2:1 | LINE 1 EXXXX XXXX | LINE 1 EXXXX XXXX | XXXX XXXX | XXXX XXXX | XXXX XXXX |
| EVEN PIXEL 1:1 | LINE 2 EXXXX XXXX | LINE 2 EXXXX XXXX | XXXX XXXX | XXXX XXXX | XXXX XXXX |
| | LINE 3 EXXXX XXXX | LINE 3 EXXXX XXXX | XXX | XXX | XXX |
| | LINE 4 EXXXX XXXX | LINE 4 EXXXX XXXX | XXX | XXX | XXX |
| | | LINE 5 EXXXX XXXX | | | |
| | | LINE 6 EXXXX XXXX | | | |
| | | 16:9 RATIO & 3:2 RATIO | 16:9 RATIO & 3:2 RATIO COMPRESSED | 16:9 RATIO & 3:2 RATIO RE-ALIGNED | 16:9 RATIO & 3:2 RATIO RE-ALIGNED & INTERLACED |
| ODD PIXEL 2:1 | LINE 1 OXXXX XXXX | LINE 1 OXXXX XXXX | XXXX XXXX | XXXX XXXX | |
| ODD PIXEL 1:1 | LINE 2 OXXXX XXXX | LINE 2 OXXXX XXXX | XXXX XXXX | XXXX XXXX | |
| | LINE 3 OXXXX XXXX | LINE 3 OXXXX XXXX | XXX | XXX | |
| | LINE 4 OXXXX XXXX | LINE 4 OXXXX XXXX | XXX | XXX | |
| | | LINE 5 OXXXX XXXX | | | |
| | | LINE 6 OXXXX XXXX | | | |
| | | 16:9 RATIO & 3:2 RATIO | 16:9 RATIO & 3:2 RATIO COMPRESSED | 16:9 RATIO & 3:2 RATIO RE-ALIGNED | |

HDTV TO NTSC TRANSCODER SYSTEM

GOVERNMENT LICENSING RIGHTS

The United States Government has a paid-up license in this invention and the right in limited circumstances to require the patent owner to license others on reasonable terms as provided for by the terms of contract number 70NANB5H1171 awarded by the National Institute of Standards and Technology.

BACKGROUND OF THE INVENTION

1. Field of the Invention

The present invention relates to video systems, and, in particular, to systems for transcoding from HDTV video signals to NTSC video signals.

2. Description of the Related Art

Many common television (TV) systems operate in accordance with the NTSC system. For example, in a typical NTSC system as used in North America, images (also referred to as video pictures or video frames) are displayed at approximately 30 frames per second, and have a resolution of approximately 720 (h)×480 (v) active pixels. Interlacing is typically used in such systems, in which 720×240 fields are received 59.94≈60 times per second, to provide a frame rate of 29.97≈30 frames/sec. Additionally, such systems broadcast and employ analog format, rather than digital format, signals.

High-definition TV (HDTV) systems broadcast digital video signals having different parameters than those of NTSC systems. For example, a typical HDTV video system transmits digital video data at 30 frames/sec (interlaced), having a resolution of 1920×1080 active pixels. Such systems typically have improved image quality, and are thus being employed more and more frequently. Some NTSC systems attempt to emulate certain aspects of HDTV systems, for example by using line doubling, field repeating, and interpolation techniques to simulate improved vertical resolution. Additionally, for image data recorded in the NTSC format, this data will need to be transformed, or "tanscoded," into the HDTV format, by such techniques.

As the HDTV standard grows in popularity, HDTV receiver systems capable of receiving and displaying HDTV signals will also become more common. However, many NTSC (non-HDTV) TV sets will remain in use even after HDTV signals are being broadcast. In some cases it may be prohibitively expensive, inefficient, or otherwise undesirable to dispose of the NTSC-compatible equipment, and replace it with HDTV-compatible receivers.

SUMMARY

Image signals are transcoded from a first format to a second format, by employing multi-tap horizontal and vertical filters. The first format has higher horizontal and vertical resolution than the second format. The multi-tap horizontal filter filters lines of the image signals to convert the horizontal resolution of the first format into the horizontal resolution of the second format, wherein the horizontal filter has a filter tap ratio selected in accordance with the horizontal ratio of the first format to the second format. The multi-tap vertical filter for filtering columns of the image signals to convert the vertical resolution of the first format into the vertical resolution of the second format, wherein the vertical filter has a filter tap ratio selected in accordance with the vertical ratio of the first format to the second format. Outputs of the horizontal and vertical filters are provided for a monitor adapted for displaying images represented by image signals in the second format, but not adapted for displaying images represented by image signals in the first format. Outputs of the horizontal and vertical filters are provided for a monitor adapted for displaying images represented by image signals in the second format, but not adapted for displaying images represented by image signals in the first format.

DESCRIPTION OF THE PREFERRED EMBODIMENT

As explained above, NTSC TV sets may be in use even after HDTV signals are being broadcast or otherwise made available. The present invention, therefore, provides an HDTV to NTSC transcoder system, which transcodes from HDTV signals to NTSC signals. Transcoding refers to the transformation of data signals in one encoding format (e.g., HDTV) into another format (e.g., NTSC). Thus, if an input image signal is in a first format and is transformed into a second format, this may be referred to as transcoding the image signal from a first format to a second format. The HDTV to NTSC transcoder system of the present invention, therefore, provides a means to transmit NTSC images from an HDTV video source. Such a system could be employed, for example, between an HDTV source (such as signals received from HDTV broadcast, cable, or satellite) and the NTSC-compatible input of a conventional NTSC TV.

Audio/Video System

Figure 1:
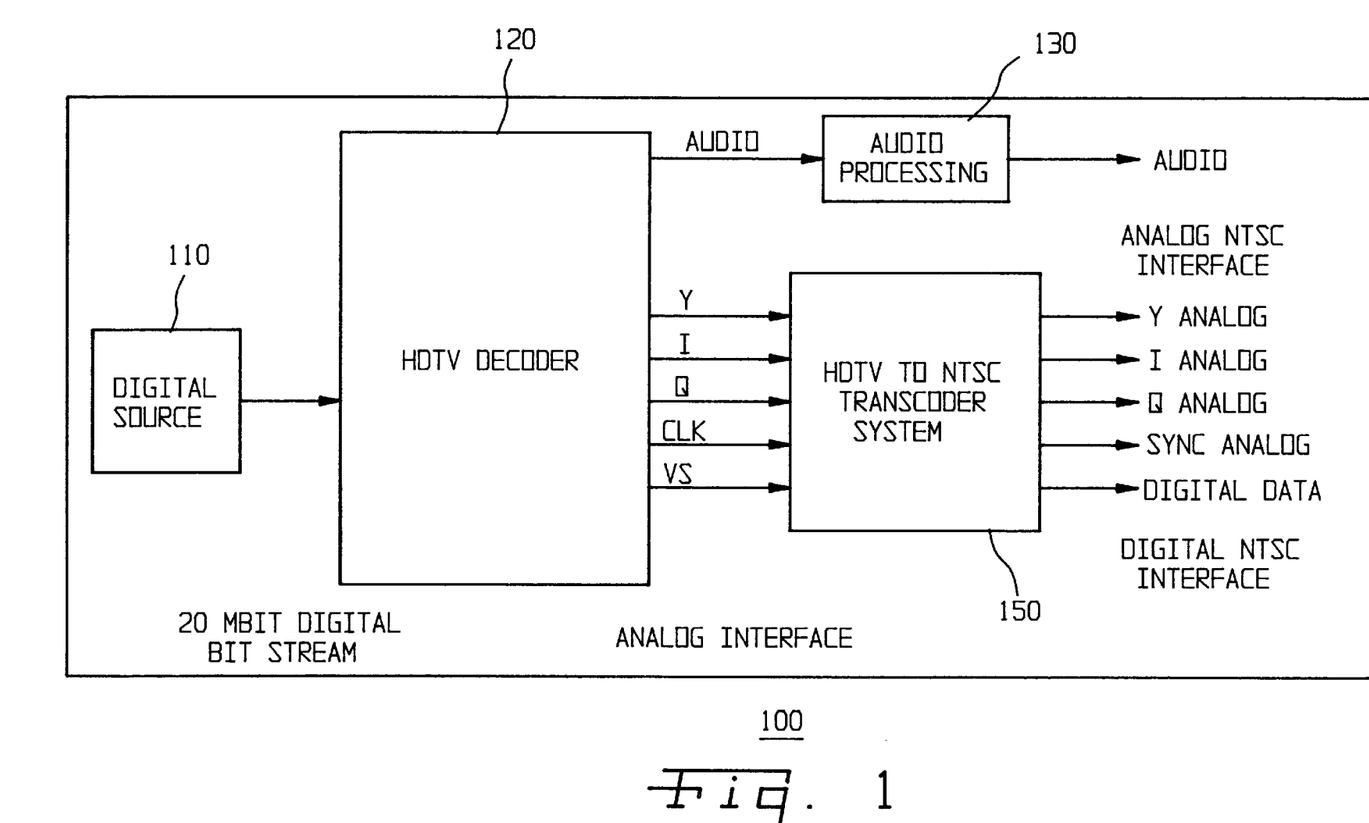
FIG. 1 is a block diagram of an audio/video system employing an HDTV to NTSC transcoder system, in accordance with an embodiment of the present invention.

Referring now to FIG. 1, there is shown a block diagram of an audio/video (A/V) system 100 employing an HDTV to NTSC transcoder system 150, in accordance with an embodiment of the present invention. As illustrated, A/V system 100 comprises a digital source 110, HDTV decoder 120, audio processing unit 130, and HDTV to NTSC transcoder system 150. HDTV signals are provided in digital form, e.g., by digital source 110, which may be, for example, the output of a digital satellite system or digital video disk. This data may be provided in compressed YIQ digital format, in a 20 Mbit digital bit stream.

The digital HDTV bit stream is provided to HDTV decoder 120, which decodes the compressed or otherwise encoded HDTV data from digital source 110, and generates analog video data, which is then provided to HDTV to NTSC transcoder system 150. Transcoder system 150 converts this input HDTV image data into analog YIQ output signals in NTSC format, as described in further detail below. These analog output signals may be applied to an analog NTSC interface so that the video signal may be displayed on any NTSC monitor or other NTSC equipment directly from HDTV to NTSC transcoder system 150. Transcoder system 150 also provides digital NTSC output data which may be applied to a digital NTSC interface.

Audio information decoded by HDTV decoder 120 is processed separately by audio processing unit 130 with compensating delay logic. In alternative embodiments, the HDTV image signals may be provideim analog instead of digital format, requiring analog-to-digital (A/D) conversion, and may be in a format other than YIQ, such as YUV or RGB.

Transcoding

In the present invention, digital HDTV video or image signals are transcoded to generate NTSC video or image signals. As mentioned previously, HDTV standards have higher horizontal and vertical resolution than the NTSC standard. Additionally, there is a slight mismatch between the frame rates of these systems, since HDTV provides exactly 30 frames per second, while NTSC systems employ 29.97 frames per second.

One way to transform HDTV pictures into NTSC pictures would be to simply decimate the input HDTV data, for example by periodically throwing away pixels. However, this technique is inefficient, since useful information is wasted. This technique can also give rise to undesirable image artifacts. For example, high frequency data, such as narrow columns of black and white, in the original data may be converted to all black or all white if simple decimation or pixel dropping is used. The present invention provides for downsampling in both the horizontal and vertical dimensions, by filtering out high frequency information from the HDTV image, with multi-tap filters, so that it would be properly displayed at pixel and line rates consistent with NTSC signals, without degrading image quality as much as would be done by the simple decimation described above.

Figure 2:
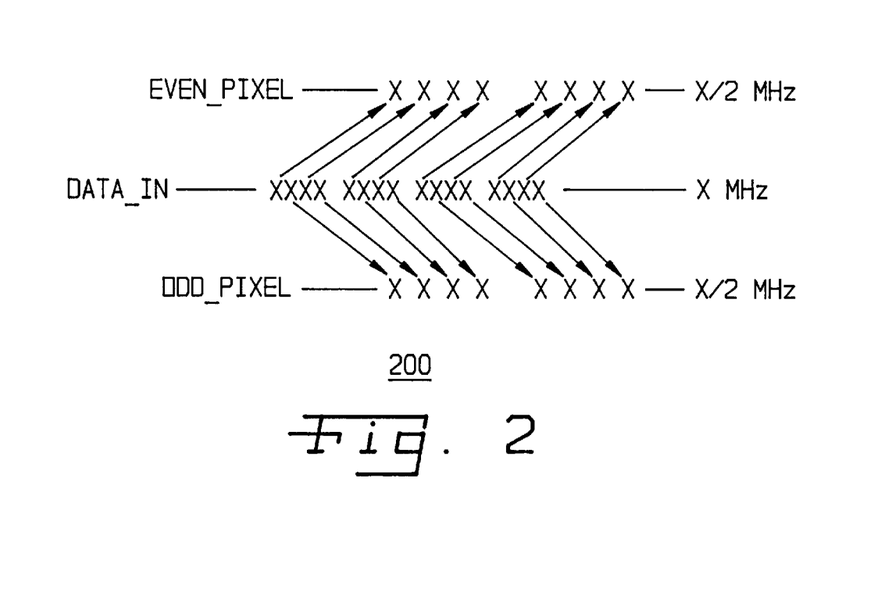
FIG. 2 is a diagram of a two dimensional format for dividing input data into even and odd pixels, in accordance with an embodiment of the present invention.

Input HDTV data may be received at a comparatively high input rate (e.g., about 76.5 MHz). Accordingly, the input stream is broken into separate streams each having half the amount of the original pixel stream and therefore is clocked with a half rate clock. The data is divided into a two dimensional format with even and odd pixels, as illustrated in diagram 200 of FIG. 2.

The present invention provides for transcoding from the following HDTV digital formats listed in Table 1, to the NTSC format of 720 active pixels by 480 active lines by 30 interlaced frames/sec:

TABLE 1

Exemplary HDTV Formats

| HDTV Format | Parameters |
| --- | --- |
| First HDTV format | 1920 pixels by 1080 lines by 30 frames/sec |
| Second HDTV format | 1440 pixels by 1080 lines by 30 frames/sec |
| Third HDTV format | 1280 pixels by 720 lines by 60 frames/sec |

Figure 3:
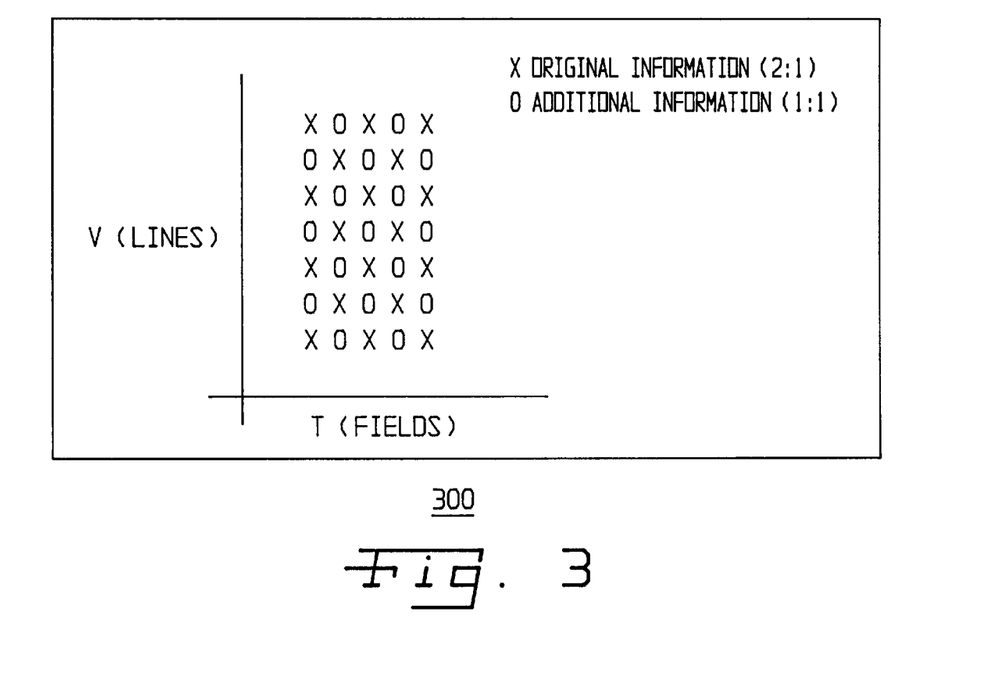
FIG. 3 is a vertical timing diagram defining a proscan format, in accordance with an embodiment of the present invention.

The thiid HDTV format above is a "proscan," or non-interlaced, format. Such a format has 60 frames per second, instead of 30 frames per second, and has twice as many lines per second as well as a different scanning format. Referring now to FIG. 3, there is shown a vertical timing diagram 300 defining a proscan format, where X represents all odd lines in a frame and is represented by (2:1), and Os are even lines in a frame, where all Xs and Os are represented by (1:1). In diagram 300, a column of Xs and Os represent a frame. When an image is in proscan format, line one will immediately proceed line 2. In an interlaced format, the second line will be in the next field or 263 lines after the first one, assuming an NTSC format.

Figure 4:
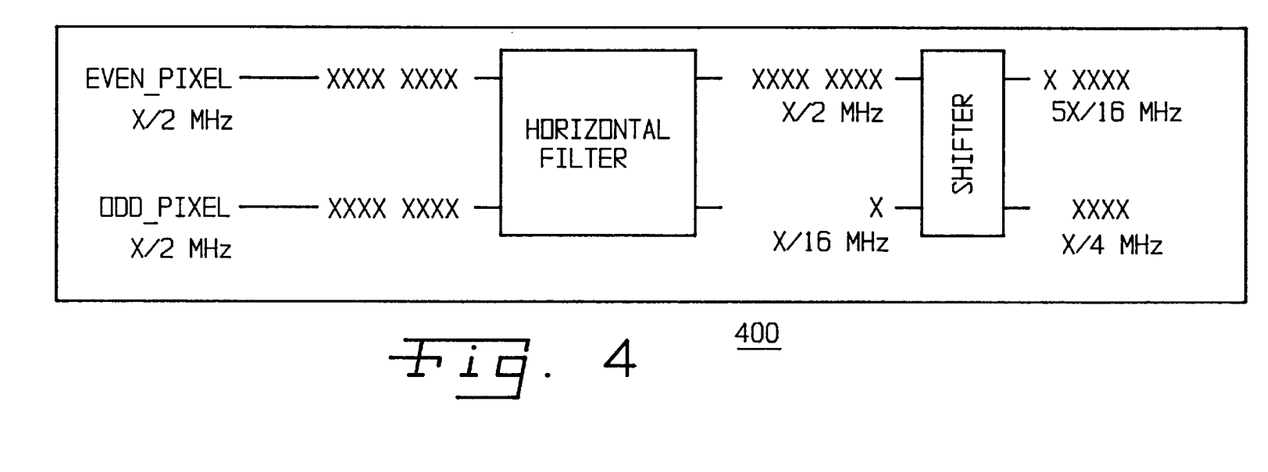
FIG. 4 is a diagram illustrating horizontal resolution after performing the horizontal filtering of the present invention, with a variety of clocks.
Figure 5:
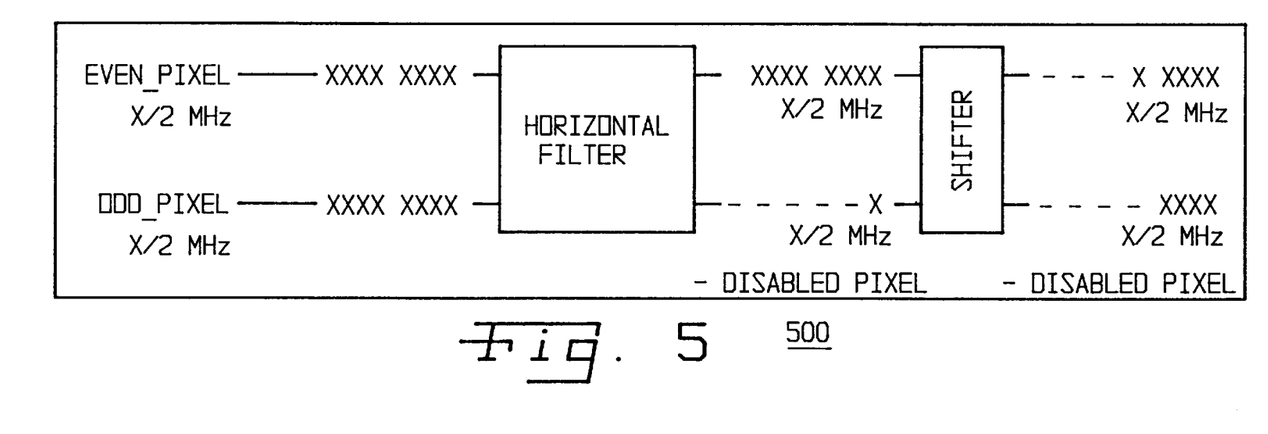
FIG. 5 is a diagram illustrating horizontal resolution after performing the horizontal filtering of the present invention, with one basic clock and a disable signal simplifying the clocking scheme.

Referring now to FIG. 4, there is shown diagram 400, illustrating the horizontal resolution after performing the horizontal filtering of the present invention, with a variety of clocks. Once the data has been filtered and decimated, the resulting pixels can be sampled with slower clocks at different frequencies. Having a host of different rates for just one format allows an even greater number of different rates for all of the different formats. Referring now to FIG. 5, there is shown diagram 500, illustrating horizontal resolution after performing the horizontal filtering of the present invention, with one basic clock and a disable signal simplifying the clocking scheme. The one clock scheme of FIG. 5 may be used, for example, when transferring pixel data from the horizontal filtering process to other processes in the system.

Filtering

HDTV to NTSC transcoder system 150 comprises both horizontal and vertical filters. The purpose of the horizontal filter is to transform each HDTV line of data into an NTSC format with as high a quality as possible. In the present invention, multi-tap decimating filters are employed by both the horizontal and vertical filters. For example, in order to reduce a line of 1280 pixels (IHDTV) to 720 pixels (NTSC), a 16:9 decimating filter is employed for the horizontal dimension. The 16:9 ratio is derived from the ratio 1280:720, taking blanking intervals and other features into account.

Thus, a tap filter is employed having a filter ratio derived from the ratio of the number of pixels being transcoded. Producing 9 NTSC pixels from 16 HDTV pixels in this manner will generate higher quality NTSC images than, for example, if 7 of the HDTV pixels were simply dropped (decimated). The coefficients of the 16×9 kernel of the 16-tap horizontal filter may be selected in accordance with desired performance characteristics or other requirements or standards, such as subjective transcoded image quality.

Other format combinations will require different filter tap ratios. For example, for the second HDTV format of Table 1, 1440 horizontal pixels in a given line requires at least a 2:1 decimating filter, and the 1280 pixels of the third format requires at least a 8:3 decimating filter. The horizontal filter has a kernel with 16 taps, with each tap having a coefficient that is programmable at the incoming pixel rate, and there is a set of up to sixteen coefficients for each of the sixteen taps in the horizontal filter for a particular video format. Given a 16-tap filter, however, the filter preferably utilizes as many input dimensions as possible for all supportable formats.

For example, a 2:1 filter is preferably implemented as a 16:8 filter, rather than actually implementing a 2:1 filter and disabling 14 of the filter's channels. For other format ratios that need to be implemented, for example 14:9, two of the filter's 16 channels can be disabled to implement a 14:9 filter. The coefficient set is different for each of the three formats shown above, and, in an embodiment, is selectable by hardware. Given the three HDTV formats listed above, a horizontal filter of 16 taps is sufficient to filter the incoming data, since the ratios 16:9, 2:1 (=16:8), and 8:3 (=16:6) can be implemented with a 16-tap decimating filter, with suitably selected and programmed coefficients.

These filters are two-dimensional (2D) filters since an input of multiple (e.g., 16) data bytes is converted to an output of multiple (e.g., 9) data bytes, requiring a 2D kernel array, having 9 sets of 16 coefficients. In alternative embodiments, larger kernels may be employed to further improve picture quality, but at the cost of more hardware and/or processing bandwidth and complexity. For example, a 32×18 kernel could be used, instead of a 16×9 kernel to implement a 16:9 filter, even though the 16×9 kernel is sufficient.

Figure 6:
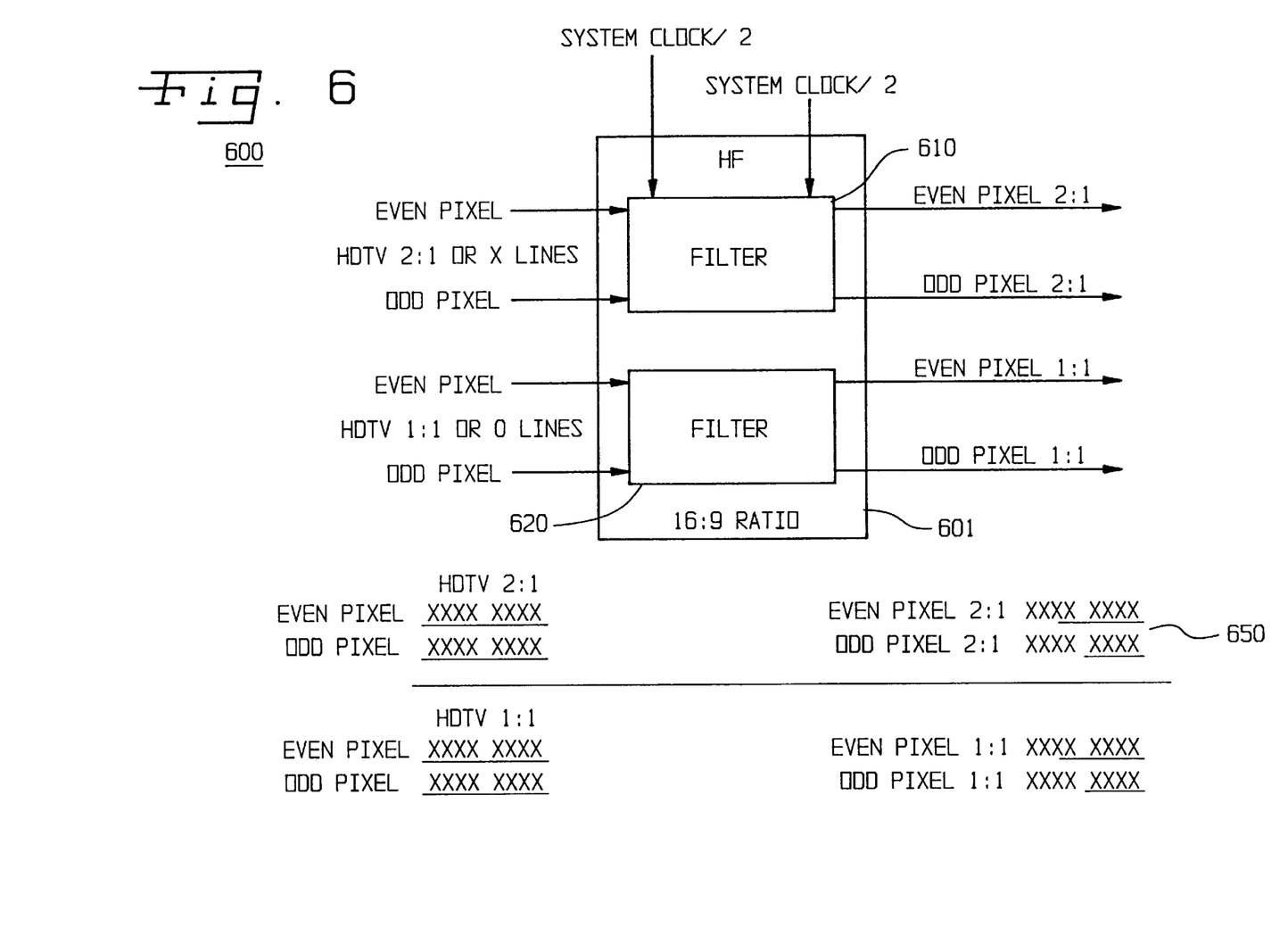
FIG. 6 is a block diagram of a horizontal filter comprising two horizontal filters, each processing a portion of a line of video data, in accordance with an embodiment of the present invention.

Referring now to FIG. 6, there is shown a block diagram 600 of a horizontal filter (HF) 601 comprising two horizontal filters 610, 620, each processing a portion of a line of video data (e.g., a 16-pixel portion), in accordance with an embodiment of the present invention. Filter 610 processes all odd lines of the proscan image or lines referenced by an X (see FIG. 3), with all even pixels entering the first input of filter 610 and all odd pixels entering the second input of filter 610. Filter 620 processes all even lines of the proscan image or lines referenced by an O (see FIG. 3), with all even pixels entering the first input of filter 620 and all odd pixels entering the second input of filter 620.

The pixel compression is presented by the pixel diagram 650 of the lower part of diagram 600, showing how a group of 16 HDTV pixels are reduced to 9 NTSC pixels by the filter using a set of coefficients that allow a 16:9 ratio downsampling. In pixel diagram 650, a bold X represents a pixel of interest where a non-bold X represents a pixel that will be discarded at some later point in processing. These latter pixels are kept to hold a place in the bit stream and to maintain synchronized clocks.

Figure 7A:
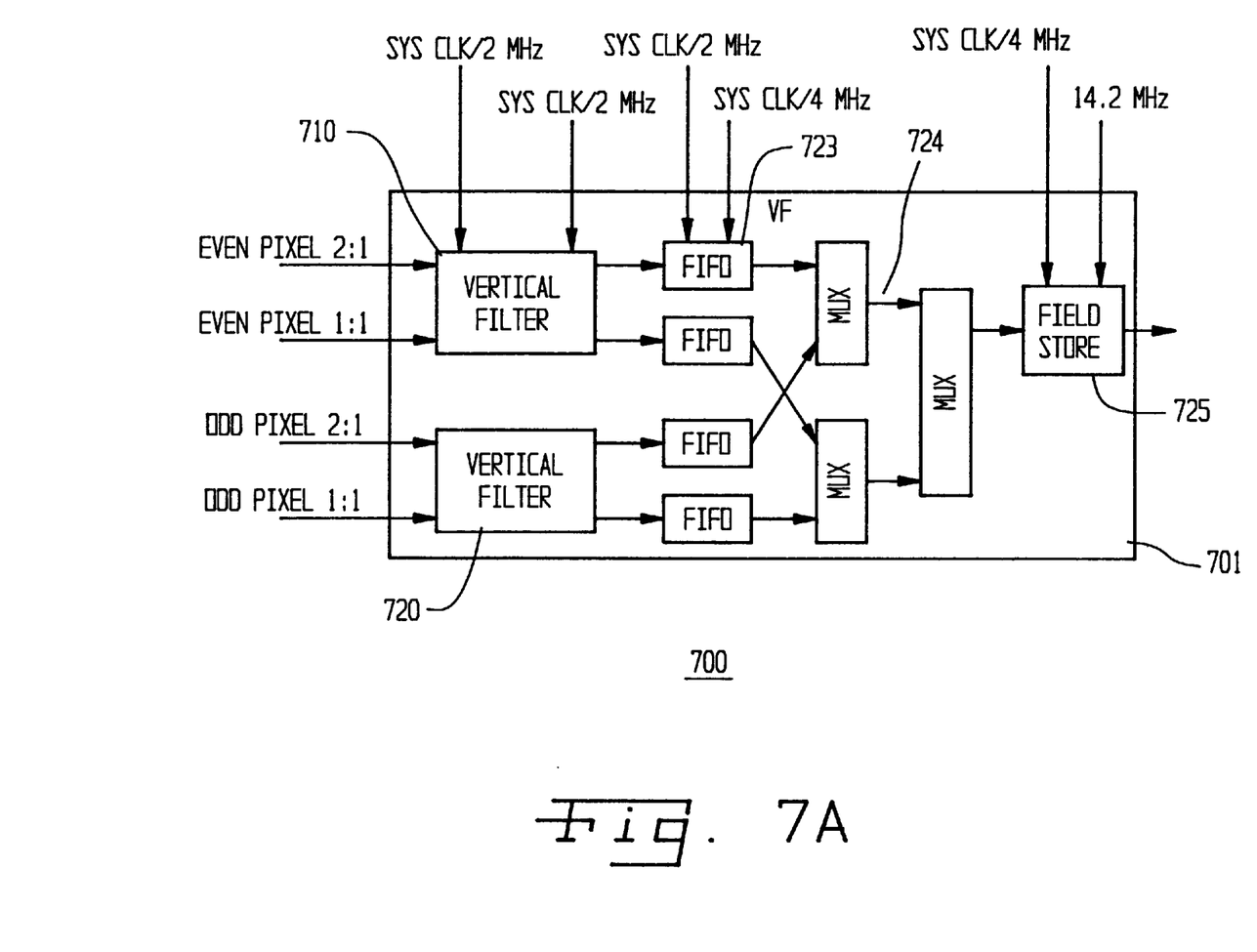
FIG. 7 is a block diagram of a vertical filter comprising two vertical filters for odd and even pixel lines, respectively, in accordance with an embodiment of the present invention.
Figure 7B:
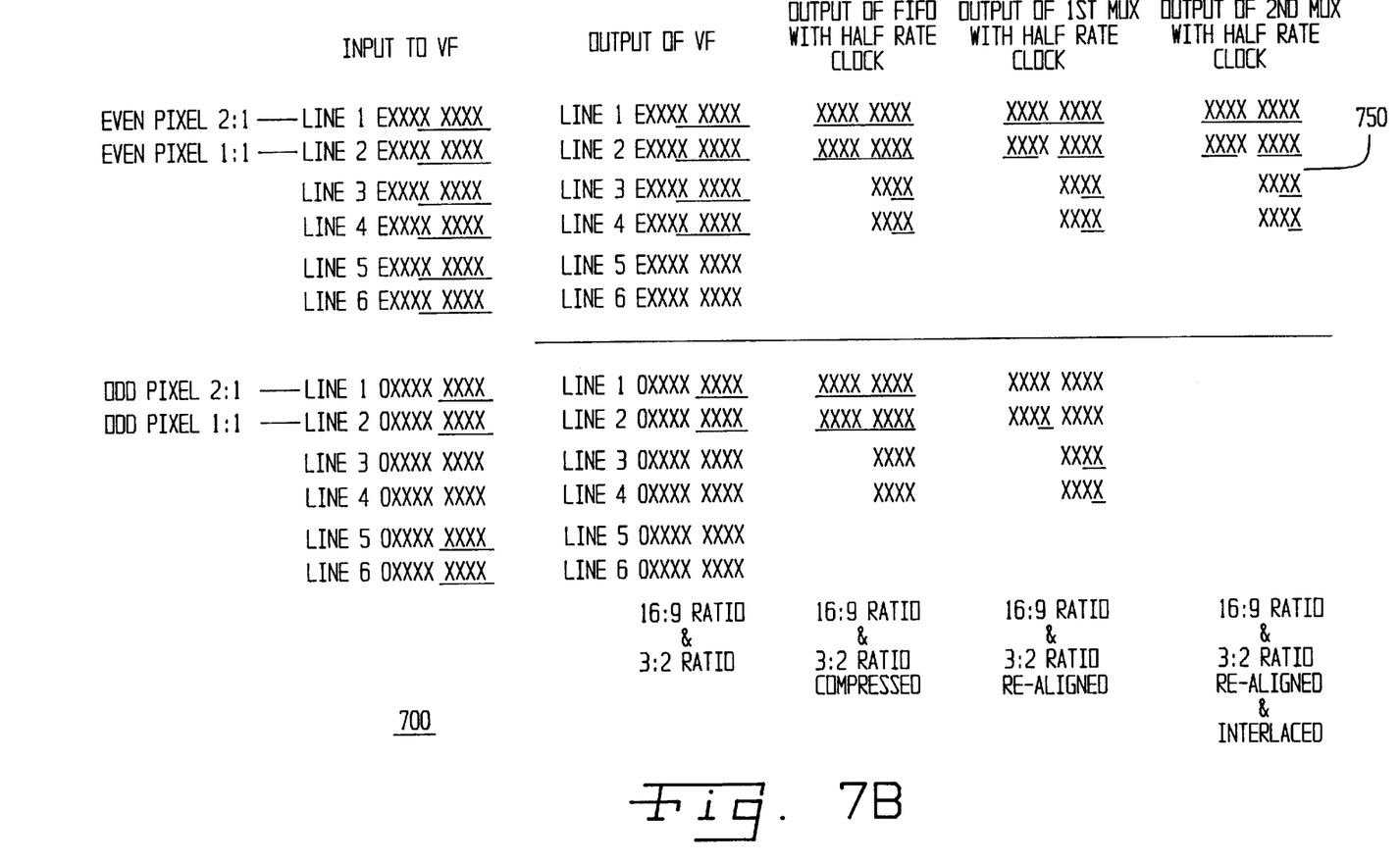

Referring now to FIG. 7, there is shown a block diagram 700 of a vertical filter (VF) 701 comprising two vertical filters 710, 720, for odd and even pixel lines, respectively, in accordance with an embodiment of the present invention. Vertical filter 701 also comprises FIFOs (first-in, first-out) or line stores 723, multiplexers (MUXes) 724, and field store 725. Vertical filter 701 downsamples each HDTV field into an NTSC field, with as high a quality as possible. In order to reduce 1080 lines to 480 lines, a 9:4 ratio decimation filter is utilized, for both the first and second HDTV formats. Similarly, the third format, with 720 lines, needs a 9:6 decimation filter. The operation of a field store is discussed in further detail below with reference to field store 825 of FIG. 8.

Vertical filter 701 operates on a column basis for pixels of the already horizontally-filtered lines of a given field. Furthermore, each filtered line is decimated by two in order to present an interlaced field. The filtering structure is similar to that of horizontal filter 601, except that pixel delays implemented in horizontal filter 601 (not shown) are replaced by line delays (FIFOs), with sixteen taps and up to sixteen coefficients for each tap, which are programmable in real-time.

Diagram 700 of FIG. 7 shows how data is processed by vertical filter 701 and the data at intermediate stages during the process. The output, provided by the output of field store 725, is an NTSC image that has an interlaced structure. In diagram 700, a line's worth of information is represented by 16 pixels, for illustrative purposes. However, for an actual NTSC line which comprises 720 pixels, there are 80 groups of 16 pixels with 9 NTSC pixels and 7 disabled pixels that are place holders. Diagram 700 also shows the intermediary pixel representations as they are converted to an NTSC image, by way of the pixel compression represented by pixel diagram 750 of the lower part of diagram 700.

Figure 8A:
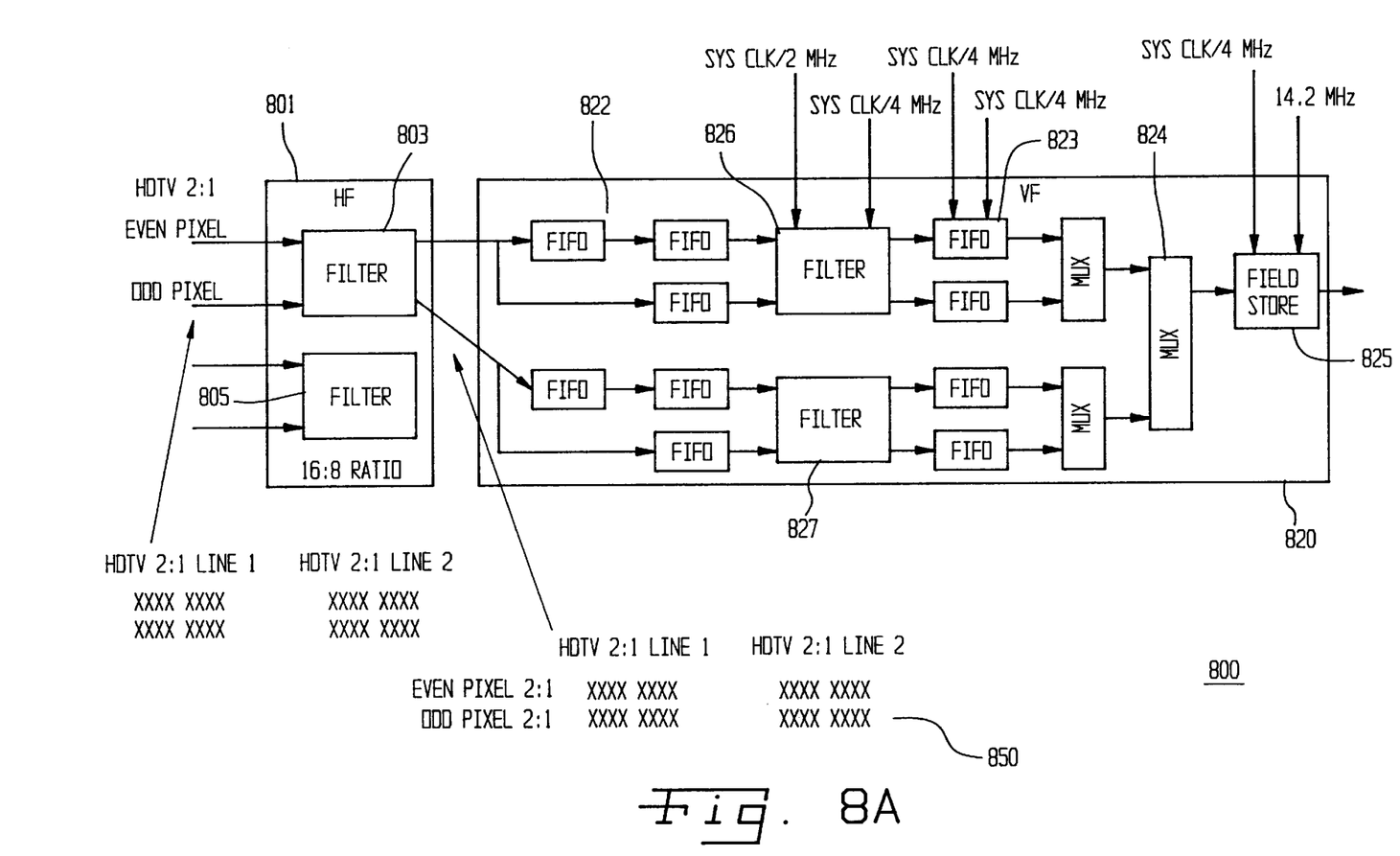
FIG. 8 is a block diagram of a transcoder system having both horizontal and vertical filters for transcoding an exemplary HDTV format, in accordance with an embodiment of the present invention.
Figure 8B:
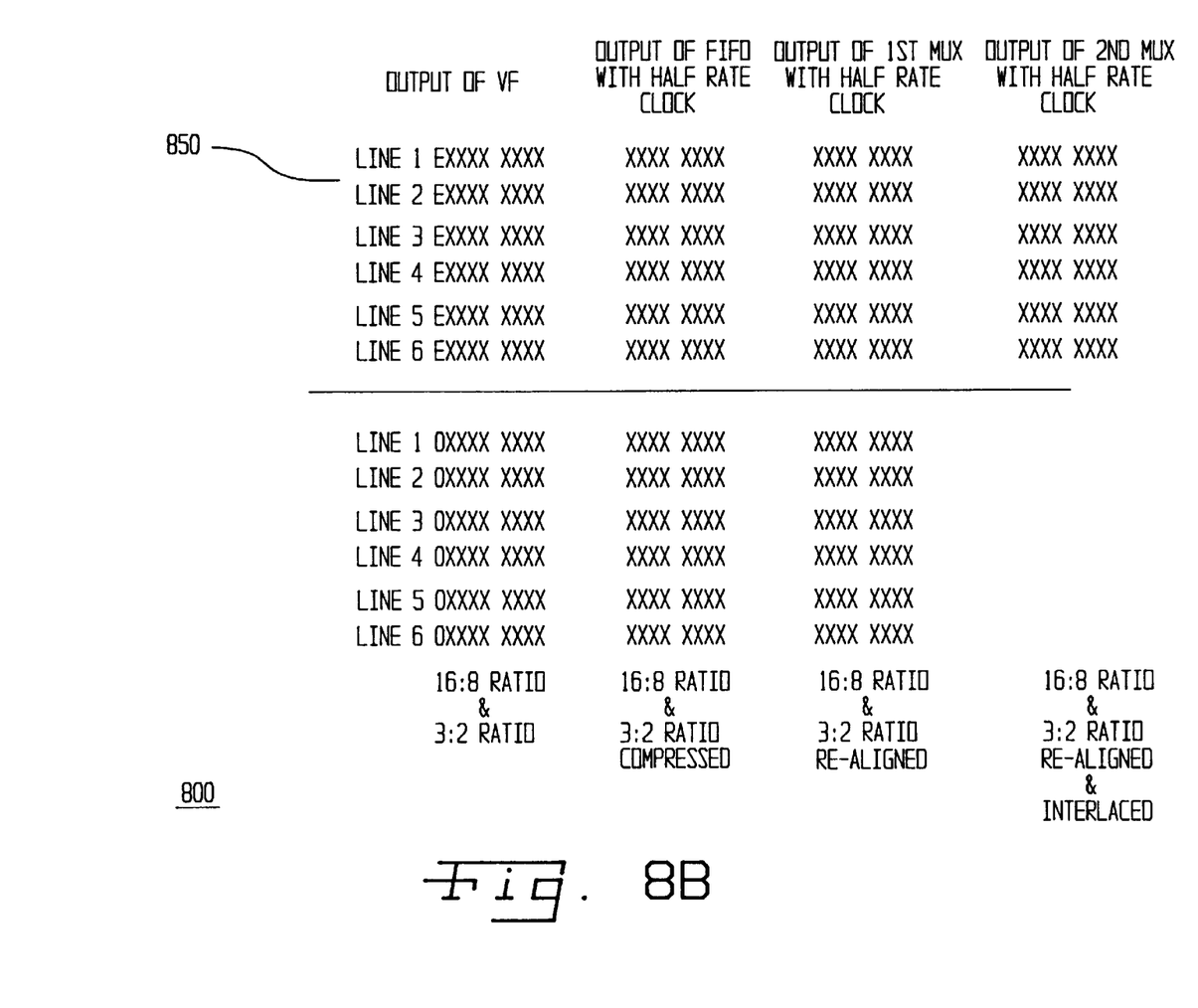

Referring now to FIG. 8, there is shown a block diagram of a transcoder system 800 having both horizontal filter 801 and vertical filter 820 for transcoding the third HDTV format of Table 1 (1280 pixels by 720 lines by 60 frames/sec), in accordance with an embodiment of the present invention. Horizontal filter 801 comprises horizontal filters 803, 805. Vertical filter 820 also comprises FIFOs 822, 823, MUXes 824, and field store 825. Vertical filter 820 preferably has the capability to present two lines of information to the processing hardware at the same time, and, therefore, utilizes FIFOs 822 at its input to handle such line structure situations. The use of FIFOs 822 therefore imparts flexibility to the transcoder of FIG. 8, for example in adjusting to different input HDTV formats. For example, to handle a particular HDTV format, some of FIFOs 822 may be switched "off" to bypass mode. Diagram 800, like diagrams 600 and 700, also represents pixel compression by pixel diagram 850 of the lower part of diagram 800.

As explained above, there may be field or frame rate mismatches between HDTV and NTSC, since NTSC has a flame rate of 29.97 frames/sec, instead of the HDTV rate of 30 frames/sec. Accordingly, field store 825 is employed at the end of the transcoder of FIG. 8, to handle and correct for any field rate mismatches. Although field store 825 is shown for illustrative purposes in FIG. 8 as being part of vertical filter 820, a transcoder of the present invention may be considered as having horizontal filter 801, coupled to vertical filter 820, coupled to field store 825.

Field store 825 is preferably a two field store, which loads an NTSC field from the processing hardware as an NTSC field is displayed to output hardware. If the field rate of the NTSC system's NTSC clock rate does not match the input formats field rate, then a field store will slowly fill up or empty at whatever is the difference between the two rates. The extra field can thus be discarded or repeated as desired to compensate for the mismatch. Field store 825 thus allows for an efficient means for correcting for frame rate mismatches, and is preferable to simpler but cruder methods.

Decoder Interface

Figure 9:
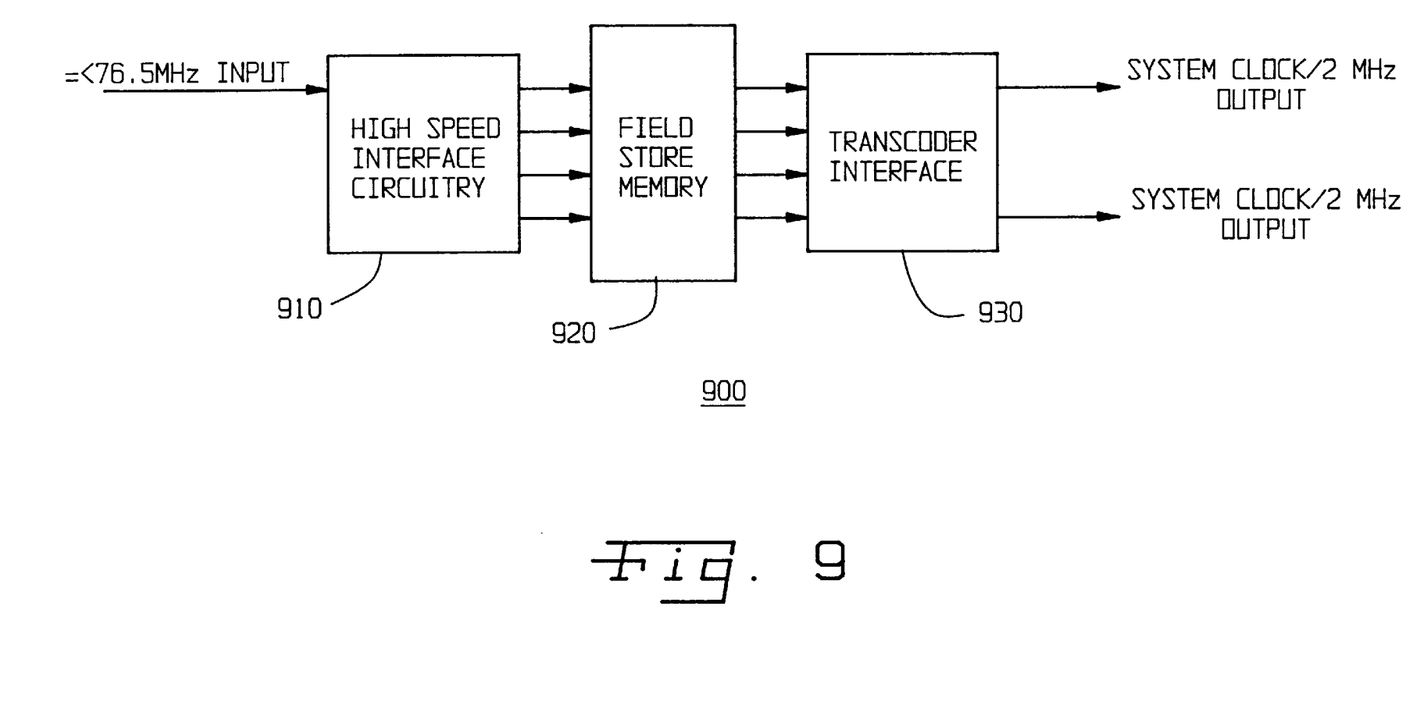
FIG. 9 is a block diagram of an HDTV decoder interface for use with the transcoder system of FIG. 8, in accordance with an embodiment of the invention.

Referring now to FIG. 9, there is shown a block diagram of an HDTV decoder interface 900 for use with transcoder system 800 of FIG. 8, in accordance with an embodiment of the invention. HDTV decoder interface 900 comprises high speed interface circuitry 910, field store memory 920, and transcoder interface 930. HDTV decoder interface 900 receives HDTV data from HDTV decoder 120 of system 100, and is internal to HDTV to NTSC transcoder system 150, as discussed further below in reference to FIG. 10. The output of HDTV decoder interface 900 is provided, for example, to the inputs to horizontal filter 803 of the transcoder system of FIG. 8.

The HDTV data provided to high speed interface circuitry 910 is provided by HDTV decoder 120 in analog YUV format along with a vertical sync signal and the pixel clock. This received data will be operating at rates as high as 76.5

MHz, and therefore is preferably split into lower speed buses in order to process the information. In such a case, field stores are employed, which allow any input format as long as the system operating frequency of the transcoder is faster than any input format clock frequency.

Therefore, high speed interface circuitry 910 splits the received data into four parts and sends the data to field store memory 920, which is a dual field store system. Thus, on the input side, data enters a field store of field store memory 920 at the input clock rate. Once the vertical sync signal for the next field is received, the input stream is switched to the second field store. This embodiment is based on the assumption that the previous field has been evacuated from the field store during the time it takes to fill the previous field. Therefore, this assumption can be met by clocking the data out of the field store faster than when it went into the memory.

Only active pixels need to be processed from the field store, which can be achieved either by not writing the blanking pixels into the field store, or by not reading them out of the field store. The first approach is preferable, since it will reduce the size of the field store. Horizontal and vertical edge processing can be achieved by reading the appropriate pixels into the pixel stream.

Transcoder System Input/Output

Figure 10:
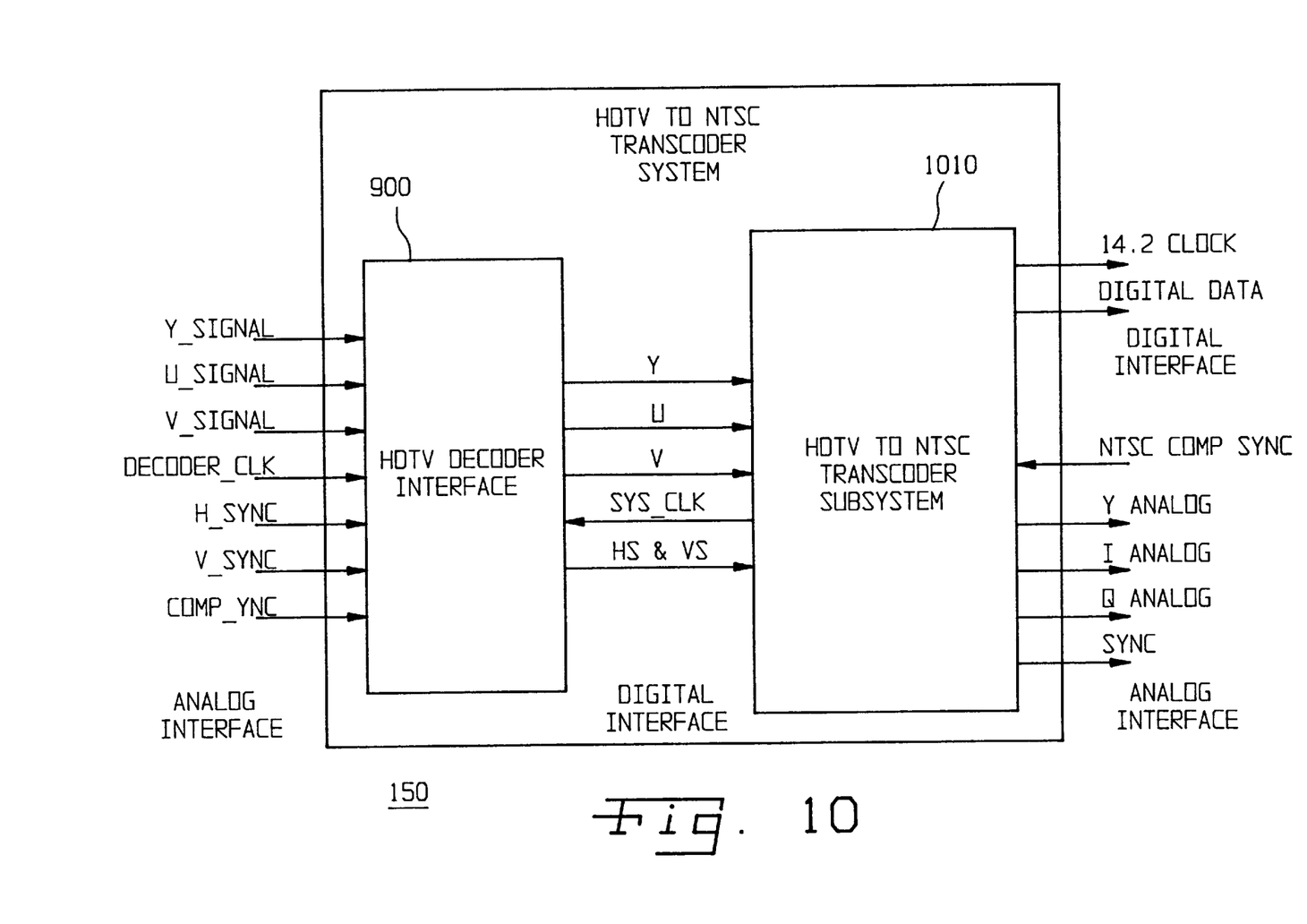
FIG. 10 is a block diagram illustrating the I/O and further details of the HDTV to NTSC transcoder system of FIG. 1, in accordance with an embodiment of the present invention.

Referring now to FIG. 10, there is shown a block diagram illustrating the I/O and further details of an embodiment of the HDTV to NTSC transcoder system 150 of FIG. 1. HDTV to NTSC transcoder system 150 comprises HDTV decoder interface 900 of FIG. 9, coupled to an HDTV to NTSC transcoder subsystem 1010. HDTV to NTSC transcoder subsystem 1010 comprises horizontal and vertical filters, FIFOs, MUXes, and a field store, similar to that of the transcoder system of FIG. 8, and, therefore, operates as described above. As illustrated by the I/O lines of HDTV to NTSC transcoder system 150, input data is digital and divided into two data paths operating at half the overall pixel rate, in an even/odd format. The system clock, a vertical sync signal, a horizontal sync signal and a mode signal, if necessary, are supplied with the data. This system provides NTSC image data in analog YIQ mode and in a digital format.

Thus, the present invention provides a system for transcoding from HDTV to NTSC images, by employing a multi-tap horizontal filter adapted to convert HDTV lines to NTSC lines, in accordance with the pixel rations therebetween; a multi-tap vertical filter adapted to convert HDTV vertical pixel columns to NTSC vertical pixel columns, in accordance with the line ratios therebetween; and a field store to correct for any field or frame rate mismatches. The vertical filter also employs FIFOs to improve system flexibility.

In alternative embodiments, the transcoding system of the present invention may be employed with formats other than NTSC and HDTV. For example, the trnscoding of the present invention may be employed, with suitable modifications, to transcode between HDTV and the European PAL standard, although a field store may not be necessary since PAL signals and HDTV signals both run at exactly 30 frames or pictures per second. Alternatively, the transcoding of the present invention may be employed to transcode between NTSC and a high-level format having higher horizontal and vertical resolution than NTSC.

The present invention is preferably embodied in the form of suitably customized application-specific integrated circuits (ASICs) or field-programmable gate arrays (FPGAs). The present invention can also be embodied in the form of computer-implemented processes and apparatuses for practicing those processes. The present invention can also be embodied in the form of computer program code embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a future general-purpose microprocessor sufficient to carry out the present invention, the computer program code segments configure the microprocessor to create specific logic circuits to carry out the desired process.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. An apparatus for transcoding image signals from a first format to a second format, wherein the first format has higher horizontal and vertical resolution than the second format, the apparatus comprising:

a multi-tap horizontal filter for filtering lines of the image signals to convert the horizontal resolution of the first format into the horizontal resolution of the second format, wherein the horizontal filter has a filter tap ratio selected in accordance with the horizontal ratio of the first format to the second format; and a multi-tap vertical filter for filtering columns of the image signals to convert the vertical resolution of the first format into the vertical resolution of the second format, wherein the vertical filter has a filter tap ratio selected in accordance with the vertical ratio of the first format to the second format;

wherein outputs of the horizontal and vertical filters are provided for a monitor adapted for displaying images represented by image signals in the second format, but not adapted for displaying images represented by image signals in the first format.

2. The apparatus of claim 1, wherein the first format is an HDTV format and the second format is an NTSC format.

3. The apparatus of claim 1, wherein the first format is an HDTV format having 1920 active pixels by 1080 lines by 30 frames/sec; and the second format is an NTSC format, having 720 active pixels by 480 lines by 30 frames/sec.

4. The apparatus of claim 3, wherein the filter tap ratio of the horizontal filter is 8:3and the filter tap ratio of the vertical filter is 9:4.

5. The apparatus of claim 1, wherein the first format is one of three HDTV formats having, respectively: 1920 active pixels by 1080 lines by 30 frames/sec, 1440 pixels by 1080 lines by 30 frames/sec, and 1280 pixels by 720 lines by 60 frames/sec; and the second format is an NTSC format, having 720 active pixels by 480 lines by 30 frames/sec.

6. The apparatus of claim 5, wherein:

the horizontal filter is a 16-tap filter having programmable tap coefficients and filter tap ratios of 8:3, 2:1, and 16:9, respectively in accordance with the three HDTV formats; and the vertical filter is a 9-tap filter having programmable tap coefficients and filter tap ratios of 9:4, 9:4, and 9:6, respectively in accordance with the three HDTV formats.

7. The apparatus of claim 1, wherein the vertical filter comprises a pair of vertical filters, each coupled at its inputs through FIFO means to the output of the horizontal filter, for processing two image signal lines simultaneously.

8. The apparatus of claim 1, further comprising a field store coupled to the output of the vertical filter for correcting for frame rate mismatches between the first and second formats.

9. The apparatus of claim 1, wherein:

the input of the horizontal filter is coupled to a signal source for providing the image signals in the first format;

the output of the horizontal filter is coupled to the input of the vertical filter; and the vertical filter provides, at its output, the image signals in the second format.

10. A method for transcoding image signals from a first format to a second format, wherein the first format has higher horizontal and vertical resolution than the second format, the method comprising the steps of:

filtering lines of the image signals with a multi-tap horizontal filter to convert the horizontal resolution of the first format into the horizontal resolution of the second format, wherein the horizontal filter has a filter tap ratio selected in accordance with the horizontal ratio of the first format to the second format;

filtering columns of the image signals with a multi-tap vertical filter to convert the vertical resolution of the first format into the vertical resolution of the second format, wherein the vertical filter has a filter tap ratio selected in accordance with the vertical ratio of the first format to the second format; and providing outputs of the horizontal and vertical filters for a monitor adapted for displaying images represented by image signals in the second format, but not adapted for displaying images represented by image signals in the first format.

11. The method of claim 10, wherein the first format is an HDTV format and the second format is an NTSC format.

12. The method of claim 10, wherein the first format is an HDTV format having 1920 active pixels by 1080 lines by 30 frames/sec; and the second format is an NTSC format, having 720 active pixels by 480 lines by 30 frames/sec.

13. The method of claim 12, wherein the filter tap ratio of the horizontal filter is 8:3 and the filter tap ratio of the vertical filter is 9:4.

14. The method of claim 10, wherein the first format is one of three HDTV formats having, respectively: 1920 active pixels by 1080 lines by 30 frames/sec, 1440 pixels by 1080 lines by 30 frames/sec, and 1280 pixels by 720 lines by 60 frames/sec; and the second format is an NTSC format, having 720 active pixels by 480 lines by 30 frames/sec.

15. The method of claim 14, wherein:

the horizontal filter is a 16-tap filter having programmable tap coefficients and filter tap ratios of 8:3, 2:1, and 16:9, respectively in accordance with the three HDTV formats; and the vertical filter is a 9-tap filter having programmable tap coefficients and filter tap ratios of 9:4, 9:4, and 9:6, respectively in accordance with the three HDTV formats.

16. The method of claim 10, wherein the vertical filter comprises a pair of vertical filters, each coupled at its inputs through FIFO means to the output of the horizontal filter, for processing two image signal lines simultaneously.

17. The method of claim 10, further comprising the step of correcting for frame rate mismatches between the first and second formats with a field store coupled to the output of the vertical filter.

18. The method of claim 10, wherein:

the input of the horizontal filter is coupled to a signal source for providing the image signals in the first format;

the output of the horizontal filter is coupled to the input of the vertical filter; and the vertical filter provides, at its output, the image signals in the second format.

19. A method for transcoding image signals from a first format to a second format, wherein the first format has higher horizontal and vertical resolution than the second format, the method comprising the steps of:

filtering lines of the image signals with a multi-tap horizontal filter to convert the horizontal resolution of the first format into the horizontal resolution of the second format, wherein the horizontal filter has a filter tap ratio selected in accordance with the horizontal ratio of the first format to the second format;

filtering columns of the image signals with a multi-tap vertical filter to convert the vertical resolution of the first format into the vertical resolution of the second format, wherein the vertical filter has a filter tap ratio selected in accordance with the vertical ratio of the first format to the second format; and providing from the horizontal and vertical filters, digital and analog outputs in the second format for a monitor adapted for displaying images represented by image signals in the second format, but not adapted for displaying images represented by image signals in the first format.

20. The method of claim 19, wherein the first format is an HDTV format and the second format is an NTSC format.

* * * * *